Dec. 7, 1954  R. T. PRING  2,696,275
WET CYCLONE SCRUBBER
Filed Feb. 21, 1951  2 Sheets-Sheet 1
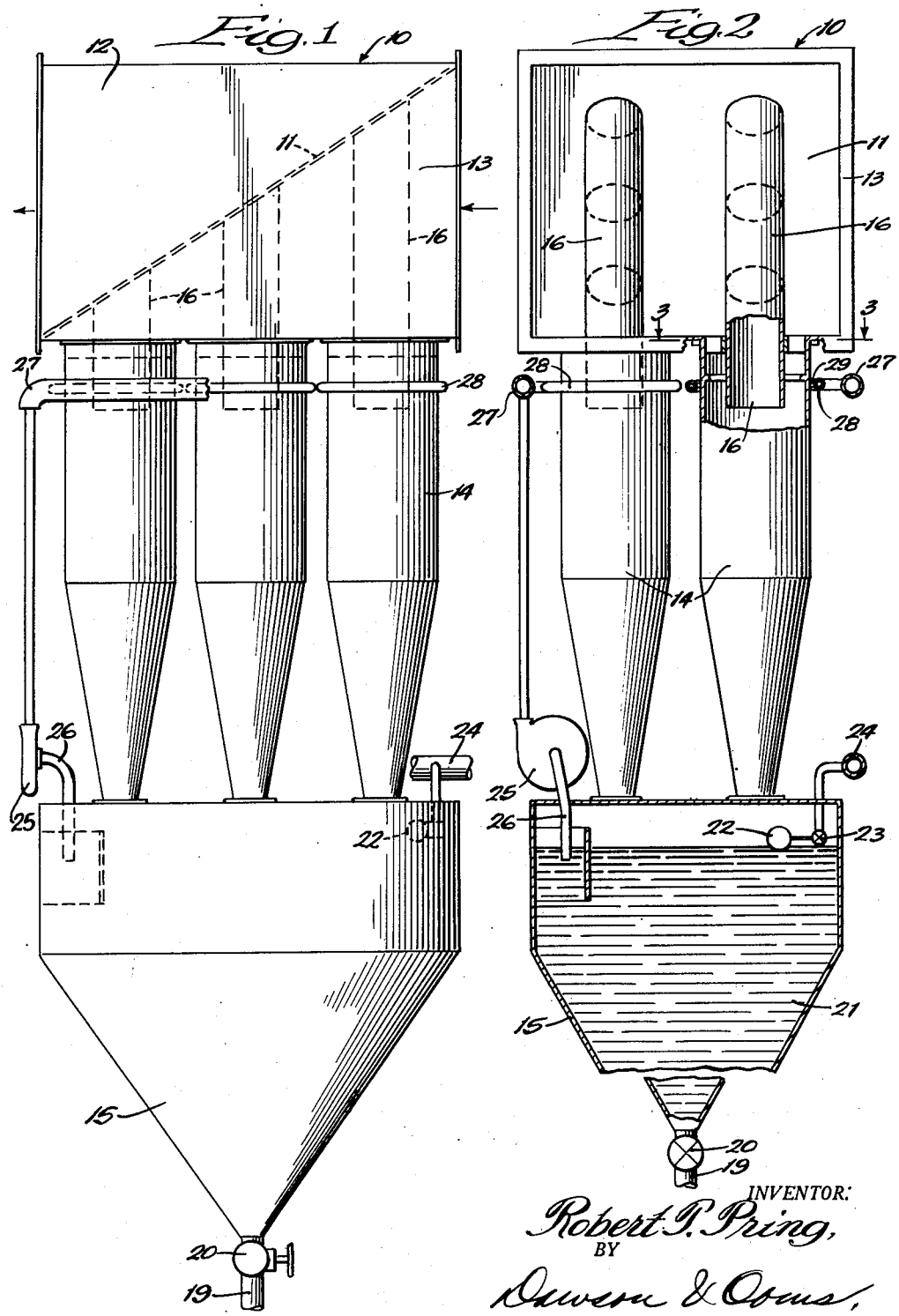
INVENTOR:
Robert T. Pring,
BY
Dawson & Ooms,
ATTORNEYS.

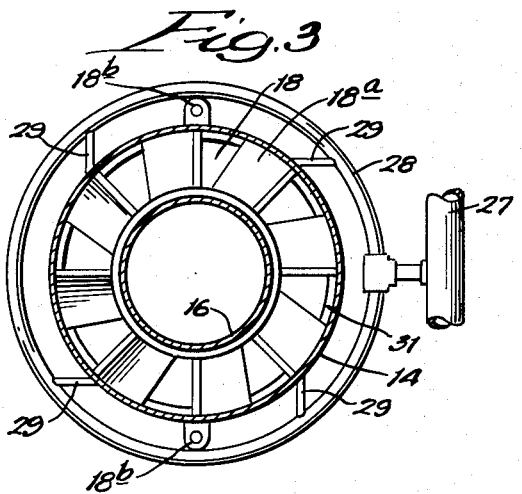
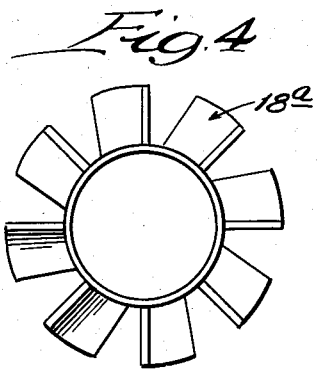
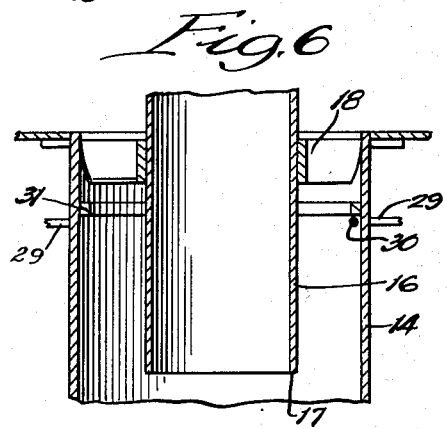
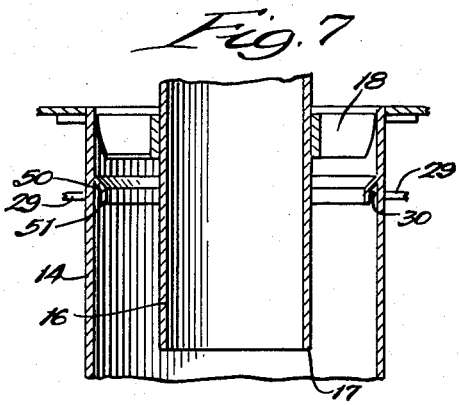
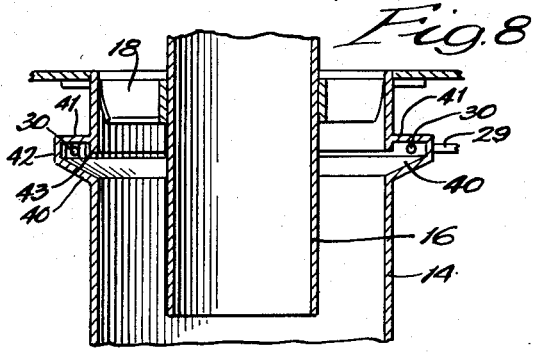

United States Patent Office 2,696,275
Patented Dec. 7, 1954

2,696,275

WET CYCLONE SCRUBBER

Robert T. Pring, South Bend, Ind., assignor to American Wheelabrator & Equipment Corp., Mishawaka, Ind., a corporation of Delaware Application February 21, 1951, Serial No. 212,042

18 Claims. (Cl. 183—30)

This invention relates to apparatus for separating dust, fumes or other particulate substances from gaseous medium and it relates more particularly to a wet scrubber of the cyclone type for effecting centrifugal separation. This application is an improvement of my copending application Serial No. 212,041 filed on February 21, 1951, and entitled Wet Cyclone Scrubber.

The use of water or other fluid medium in a cyclone separator to provide a type of wet scrubber has been tried before but use has been limited to cyclone units of large dimension, such for example as those having a wall to wall dimension greater than 20 to 24 inches. This limitation with respect to size is imposed because of the tendency for the wet and dry junction to fluctuate up and down the wall of the cyclone whereby the wet separated particulate substance builds up on the cyclone wall. With cyclones of large dimension, the obstruction created is insufficient to impair the desired flow of gaseous medium for normal operation, but with cyclones of smaller diameter, the build-up thereon obstructs the space available between outer and inner cyclone tubes so that the unit is thereafter unable to operate in the manner for which it was intended.

In the practice of this invention, it is desirable to make use of cyclone units of small diameter employing turning vanes instead of tangential inlets to impart cyclonic movement to the gaseous medium passing therethrough. With units of this type a number of cyclone tubes can be mounted in close proximity to each other and connected to inlet and outlet plenum boxes or chambers. The advantage derived from this arrangement is principally space saving.

Earlier attempts to make use of smaller cyclones as wet scrubbers have embodied the installation of liquid sprays in the inlet plenum chamber through which the gaseous medium to be cleaned or scrubbed is passed. The plenum chamber served in the dual capacity of a contacting chamber for mixing the liquid and gas and as the distribution duct by which the mixture was introduced into a number of cyclone units. In operation, it was found that the wetted dusts and particulate substances deposited in the inlet chamber and in the narrow space between the cyclone tubes whereby the unit became plugged, as previously described, are unfit for use. In addition, the liquid spray became entrained by the gaseous medium and was carried through the system and into the atmosphere. This created an undesirable condition in the near vicinity of the discharge for the cleaned gas.

It is an object of this invention to produce a wet scrubber of the cyclone type which is not subject to limitations of units previously described.

Another object is to produce a cyclone separator of small size which may be efficiently and effectively operated as a centrifugal wet scrubber.

A further object is to produce a wet cyclone scrubber which substantially eliminates fluctuation of the wet and dry juncture on the inner wall of the cyclone tube and therefore can be adapted for use in cyclone separators having smaller wall to wall dimensions than has heretofore been considered practical.

A still further object is to produce a wet cyclone scrubber employing a moving layer of fluid for entrapping particulate substances separated from the gaseous medium and for flushing the particulate substances as collected almost immediately out of the cyclone chamber.

A still further object is to provide a centrifugal wet cyclone which does not make use of sprays within the separating portion or within the plenum chamber.

The principal object of this invention is to produce a wet cyclone scrubber of small diameter which operates in an effective and expedient manner and it is a related object to produce a scrubber of the type described which makes use of a plurality of cyclone units in an assembly.

These and other objects of this invention will hereinafter appear and for purposes of illustration, but not of limitation, embodiments of this invention are shown in the accompanying drawings in which—

Figure 1 is a side elevational view of a wet cyclone scrubber embodying features of this invention;

Figure 2 is a front elevational view of the apparatus shown in Figure 1;

Figure 3 is a sectional view taken along the line 3—3 of Figure 2;

Figure 4 is a top plan view of a turning vane employed in the practice of this invention;

Figure 5 is a side elevational view of the turning vane shown in Figure 4;

Figure 6 is a sectional elevational view through an upper portion of a cyclone tube assembly embodying features of this invention;

Figure 7 is a sectional elevational view of an upper portion showing another modification of a cyclone tube assembly, and Figure 8 is a sectional elevational view showing a still further modification in a cyclone tube assembly.

It has been found that wet scrubbing can be successfully practiced in a cyclone tube assembly of small size, i. e. less than 18 inches in diameter, if a moving layer of fluid is caused to flow upon the walls of the outer cyclone tube from a short distance below the means by which the incoming gaseous medium to be cleaned is given a rotational or cyclonic motion, as described in my copending application, and if in addition a baffle or barrier is arranged on the wall of the outer cyclone tube between the means for imparting cyclonic motion to the gaseous medium and the inlet for the fluid to prevent substantial fluctuation of the wet line. This arrangement obviates the build-up of large deposits of wet particulate substances on the wall of the tube where it may interfere with the flow of gaseous medium between the outer and inner cyclone tubes of small size.

As shown in the drawing, the features of this invention may be embodied in a multiclone system comprising a rectangular housing 10 having a sloping separating wall 11 which divides the housing into a clean air plenum chamber 12 and an inlet plenum chamber 13. A number of vertically disposed outer cyclone tubes 14 connect the bottom of inlet plenum chamber 13 with a hopper or tank 15.

Each outer cyclone tube 14 is provided with a concentric inner cyclone tube 16 of smaller wall to wall dimension having its lower end 17 terminating intermediate with ends of the outer cyclone tube and preferably a short distance between the entrance thereof at the base of the inlet plenum chamber 13. The upper ends of the inner cyclone tubes 16 lead into suitable openings in the separating wall 11 so as to communicate with the clean air plenum chamber 12.

A plurality of stationary guide vanes which are sloped to impart spiral or cyclonic motion to the gaseous medium passing therethrough, hereinafter called turning vanes 18, are positioned in an assembly 18a located, as by set screws 18b, at the entrance of the outer cyclone tube and occupies the space between the outer cyclone tube and the inner cyclone tube.

A drain 19 operated by valve 20 is provided to empty sludge which collects in the base of the hopper 15. The hopper is adapted to maintain a predetermined level of fluid 21 by regulation through a float 22 which operates a valve 23 that permits the addition of fluid from a fluid supply pipe 24. A pump 25 having an inlet pipe 26 extending below the level of the fluid 21 in the tank 15, circulates fluid, such as water, from the tank to a main header 27. The main header supplies fluid under pressure to intermediate or sub-headers 28 which encircle each of the outer cyclone tubes 14 and admits fluid through nipples 29 to fluid inlets 30 for admitting fluid about the inner wall of the outer cyclone tube. It is preferred to introduce the fluid by tangential flow in order to cause the fluid to wet substantially the entire side wall of the outer cyclone tube at approximately the same level near the inlets. Optimum results are secured when the fluid is introduced in a tangential direction opposite that of the spiral movement of the gaseous medium. This imparts a type of counter-current flow which is most effective. It is also preferred to locate the fluid inlets 30 just a short distance betlow the turning vanes 18 and within the confining space occasioned by the overlap of the inner and outer cyclone tubes. Although it is preferred to employ a plurality of fluid inlets spaced at about the same level to introduce a uniform curtain of water down the wall of the tube, it is possible to practice this invention with a single inlet to introduce a tangential stream of water upon the wall.

Even though the fluid inlets are located below the turning vanes to cast a fluid stream upon the side wall of the outer cyclone tube there remain a tendency for the border line between the wet zone and the dry zone to fluctuate up and down the wall of the tube so that the particulate substances separated from the incoming gaseous medium will not be washed down into tank 15 but will collect as a packed mud on the side walls. The obstruction thus formed often obstructs the free flow of the gaseous medium (and prevents normal operation). In order to overcome this objection it has been found desirable to provide means for holding the wet and dry juncture relatively constant.

For this purpose, a barrier is provided to prevent vertical motion of the wet-dry juncture on the inner wall of the outer cyclone tube. Alternatively, a barrier may be introduced to shield the zone of fluctuation of the wet-dry junction from direct contact with dust or fume laden gas. Best practice calls for the application of fluid to the inner wall surface of the outer cyclone tube, as close as possible below the turning vanes, to the point of initial contact of particulate matter with the wall surface, to provide maximum contact. The barrier thus provided eliminates contact between the solid particles contained in the rotating gas stream and any area on the cyclone inner wall which might become alternately wet and dry and upon which wetted particles might become deposited.

In a preferred modification the barrier is in the form of an annular bead or ring 31 which projects from the inner wall of the outer cyclone tube 14 and is located just above the fluid inlets 30.

In another modification shown in Figure 8, the barrier is in the form of an annular recess 40 formed to extend outwardly from the wall of the outer cyclone tube 14. The fluid inlets 30 are located below the horizontally disposed upper wall 41 of the recess and are preferably located within the recess itself, such as at the base 42 of the recess. As illustrated in the drawing, a portion of the wall may overhang the recess to shield the surface adjacent to the fluid inlet means from the impingement of solid particles in the spirally-traveling gas stream. The unit corresponding to this modification may also be used with corresponding success without the overhang 43.

In a further modification, shown in Figure 7, the barrier is in the form of an apron which extends downwardly and inwardly from the inner wall of the outer cyclone tube 14. The apron is shown as being constituted of a downwardly and inwardly inclined portion 50 joined at its upper edge to the tube wall and having an integral vertically disposed rim 51 in parallel spaced relation with the wall of the outer cyclone tube 14. The fluid inlets 30 are located below the apron and preferably behind the apron so as to inject the fluid stream onto the wall of the outer cyclone tube in an area which finds little interference with the swirling gaseous medium.

In operation, air or other gaseous medium laden with dust particles, fumes or other particulate substances, is passed into the plenum chamber 13. The incoming gaseous medium divides itself into substantially equal portions which flow through the cyclone units. The portion passing through a cyclone unit first contacts the turning vanes which operate to impart a swirling motion to the gaseous medium. This swirling motion tends to throw the entrained particles toward the outer perimeter. The dust particles or particulate substances are thus caused to impinge upon the curtain of water or fluid moving down the outer wall of the cyclone unit and is flushed therewith into the tank or hopper 15.

The cleaned gaseous medium reverses its direction of flow after it passes beyond the lower end portion 17 of the inner cyclone tube and, while still somewhat in swirling motion, passes up through the inner cyclone tube into the clean air plenum chamber and out into the atmosphere. It is expected that some of the dust particles or particulate substances may also be separated from the gaseous medium by forces which operate during such reversal of movement of the gaseous medium as it turns to flow through the inner cyclone tube.

There is reason to believe that the added efficiency of a wet cyclone of the type described results from a scrubbing action effected between the particulate laden gaseous medium and the fluid which travels down the wall of the outer cyclone tube. In practice, water or other fluid is introduced longitudinally into the outer cyclone tube in such a manner that substantially the entire wall of the tube below the level of the inlets becomes wetted with a moving layer of fluid. Particulate substances centrifugally thrown upon the wet layer are thereby wetted and flushed with the fluid curtain into the tank, and settle to the bottom of the tank for occasional drainage. Wetting of the particulate substances reduces the possibility of reentrainment in the outgoing air stream.

The improved efficiency of a wet scrubber embodied in the features of this invention may be illustrated by the following tests: Equal portions of air laden with copper ore dust from the Kennecott Copper Corporation was provided. One portion was passed through a conventional 9 inch diameter cyclone of the multiclone type, operated as a dry cyclone. The other portion was passed through a cyclone of the same size but modified according to this invention and operated as a wet scrubber. The dry separator collected 87.7 percent of the solids introduced in the gas stream; the wet scrubber recovered 90.2 percent. This represents about a 20–25 percent improvement in the amount of dust that is allowed to remain entrained in the clean air.

Further improvement in collection efficiency was effected when the counter-current fluid flow principle was employed in the practice of the applicant's invention. With the water injected tangentially in a direction parallel to the path of gas rotation, the collection efficiency was 90.2 percent by weight. With the water introduced countercurrently to the direction of flow of the swirling gas, the efficiency was 94.0 percent. In practice, the relative benefits of parallel and counter-current flow will depend on the characteristics of the particles to be wetted.

It will be understood that the concepts of this invention are not limited to systems employing multiple cone units but they may be practiced equally well with a single unit, as set forth in the comparative tests.

It will also be understood that instead of recirculating the fluid from the collecting tank 15, the fluid curtain may be supplied from sources entirely divorced from the collection unit such as from a well or other reservoir when water is the fluid medium.

It will be further understood that numerous changes may be made in the details of construction, arrangement and operation without departing from the spirit of the invention, especially as defined in the following claims.

I claim:

1. A wet cyclone scrubber comprising a pair of concentrically arranged and vertically disposed outer and inner cyclone tubes, means at the upper end of the outer cyclone tube to impart rotational improvement to the gaseous medium passing downwardly between the outer and inner cyclone tubes, inlet means in the wall of the outer cyclone tube for introducing fluid tangentially onto the walls of the outer cyclone tube to form a curtain of water moving down the wall of the tube, and an overhang adjacent the fluid inlets to permit formation of the curtain of water moving down the outer cyclone wall without interference from the air stream.

2. A wet cyclone scrubber comprising at least one pair of outer and inner cyclone tubes concentrically arranged with the end of the inner tube terminating intermediate the ends of the outer cyclone tube, cyclonic initiating means located at the entrance end of the outer cyclone tube between the outer and inner cyclone tubes, inlet means in the wall of the outer cyclone tube arranged to introduce substantially tangential streams of fluid onto the inner wall of the outer cyclone tube, and an annular barrier on the inner wall of the outer cyclone tube between the rotational means and the fluid inlet means.

3. A wet cyclone scrubber as claimed in claim 2 in which the fluid inlet means is located in a portion of the outer cyclone tube which lies alongside the inner cyclone tube.

4. A wet cyclone scrubber as claimed in claim 2 in which the streams of fluid are tangentially introduced in a direction counter-current to the rotational movement of the gaseous medium.

5. A wet cyclone scrubber comprising an outer cyclone member, an inner cyclone member arranged concentrically within a part of the outer cyclone member, vanes located within the space between the inner and outer cyclone members to impart a cyclonic motion to the gaseous medium passing therethrough, inlets in the wall of the outer cyclone member for introducing fluid onto the inner wall of the outer cyclone member, and a circumferential barrier extending from the inner wall of the outer cyclone member between the vanes and the inlets.

6. A wet cyclone scrubber as claimed in claim 5 in which the inlets are located a short distance beneath the vanes.

7. A wet cyclone scrubber as claimed in claim 5 in which the barrier comprises a circumferential abutment projecting a short distance inwardly from the inner wall of the outer cyclone member.

8. A wet cyclone scrubber as claimed in claim 5 in which the barrier comprises a circumferential recess formed to extend outwardly from the inner wall of the outer cyclone member.

9. A wet cyclone scrubber as claimed in claim 8 in which the fluid inlets are located within the recessed portion of the outer cyclone member, and a baffle extends downwardly from the wall to overhang the inlets.

10. A wet cyclone scrubber as claimed in claim 5 in which the barrier comprises a baffle projecting inwardly and downwardly from the inner wall of the outer cyclone member.

11. A wet cyclone scrubber as claimed in claim 10 in which the fluid inlets are located behind the baffle.

12. In a wet cyclone scrubber having an outer cyclone tube and an inner cyclone tube in spaced apart relation and having turning vanes to impart rotational movement to the incoming gaseous stream as it passes between the inner and outer cyclone tubes, inlets for introducing streams of water tangentially onto the inner wall of the outer cyclone tube and in an upper portion thereof to provide a wall of water washing down the inner walls of the outer cyclone tube and which defines a wet zone as distinguished from a dry zone above the wall of water, and a circumferential barrier positioned in spaced apart relation from the inner wall of the outer cyclone tube in the region of the inlets to minimize fluctuation of the juncture between the wet and dry zones of the inner wall of the outer cyclone tube.

13. In a wet cyclone scrubber having turning vanes to impart a rotational motion to the incoming gaseous medium as it passes between outer and inner cyclone tubes, inlets in the outer cyclone tube for introducing fluid in a tangential direction onto the inner wall of the outer cyclone to provide a wall of water in a wet zone washing down the inner wall of the outer cyclone tube, and barrier means located circumferentially on the inner wall of the outer cyclone just above the fluid inlets to minimize fluctuation of the wet zone on the inner wall of the outer cyclone member.

14. A wet cyclone scrubber as claimed in claim 13 in which the barrier comprises a circumferential ledge projecting inwardly a short distance from the inner wall of the outer cyclone.

15. A wet cyclone scrubber as claimed in claim 13 in which the barrier comprises an annular recess which extends outwardly from the inner wall of the outer cyclone and in which the fluid inlets are located behind a circumferential baffle forming a flush surface in continuation of the inner wall of the outer cyclone tube.

16. A wet cyclone scrubber as claimed in claim 13 in which the barrier comprises an annular apron inclined to extend inwardly from the wall of the outer cyclone and behind which the inlets are located.

17. A wet cyclone scrubber as claimed in claim 13, in which the inlets are arranged to introduce the fluid in a direction counter-current to the rotational motion of the gaseous medium.

18. A wet cyclone scrubber as claimed in claim 13, in which fluid is introduced at at least one point on the inner wall of the outer cyclone tube and carried around the circumference by the rotational motion of the gas stream.

References Cited in the file of this patent

UNITED STATES PATENTS

| Number | Name | Date |
|---|---|---|
| 968,456 | Edwards | Aug. 23, 1910 |
| 1,715,549 | Hawley | June 4, 1929 |
| 1,875,755 | Noyes | Sept. 6, 1932 |

FOREIGN PATENTS

| Number | Country | Date |
|---|---|---|
| 341,058 | Great Britain | Jan. 6, 1931 |